(12) United States Patent
Choi et al.

(10) Patent No.: US 8,547,332 B2
(45) Date of Patent: Oct. 1, 2013

(54) POINTING DEVICE USER INTERFACE METHOD, MEDIUM, AND SYSTEM ROBUST AGAINST EXTERNAL NOISE

(75) Inventors: Ki-wan Choi, Anyang-si (KR); Sun-gi Hong, Hwasung-si (KR); Ho-joon Yoo, Goyang-si (KR); Nam-woo Kim, Hanam-si (KR); Su-jinn Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1442 days.

(21) Appl. No.: 11/652,515

(22) Filed: Jan. 12, 2007

(65) Prior Publication Data
US 2007/0188449 A1 Aug. 16, 2007

(30) Foreign Application Priority Data

Feb. 10, 2006 (KR) .......................... 10-2006-0013267

(51) Int. Cl.
*G09G 5/08* (2006.01)
*G06F 3/033* (2013.01)

(52) U.S. Cl.
USPC ........... 345/158; 345/157; 345/169; 382/313; 382/314

(58) Field of Classification Search
USPC .................... 345/156–184; 178/19.05–19.07; 382/312–324
See application file for complete search history.

(56) References Cited

U.S. PATENT DOCUMENTS 6,967,644 B1 * 11/2005 Kobayashi .................... 345/158
2001/0050672 A1 * 12/2001 Kobayashi .................... 345/158

FOREIGN PATENT DOCUMENTS

| JP | 2000-348198 | 12/2000 |
| KR | 10-2004-0027561 | 4/2001 |
| KR | 10-2003-0046093 | 6/2003 |
| KR | 10-2003-0086792 | 11/2003 |

OTHER PUBLICATIONS

English translation of Korean Pub. No. 10-2004-0027561, the title A TV system with a camera-based pointing device, and an acting method thereof, inventor Lee Gi-Hyeok, pub. date Apr. 1, 2004 and applicant Information and communication university educational foundation, 16 pages.*

* cited by examiner

*Primary Examiner* — William Boddie
*Assistant Examiner* — Saifeldin Elnafia
(74) *Attorney, Agent, or Firm* — Staas & Halsey LLP

(57) ABSTRACT

A pointing method, medium, and system detecting a synchronization signal from a plurality of light sources sequentially blinking at predetermined periods, detecting position information of the light sources by driving a video camera in synchronization with the synchronization signal, removing noise from among observed light sources by using the position information, and calculating a pointed to position by using the position information of the non-noise light sources. Provided is also a pointing reception method, medium, and system using a plurality of light sources blinking sequentially at predetermined periods, receiving the position information corresponding to light sources presenting the signals received by a pointing device and the position information pointed by the pointing device, and changing output data with respect to the pointed position information.

40 Claims, 10 Drawing Sheets

POINTING DEVICE USER INTERFACE METHOD, MEDIUM, AND SYSTEM ROBUST AGAINST EXTERNAL NOISE

CROSS-REFERENCE TO RELATED APPLICATIONS

This application claims priority from Korean Patent Application No. 10-2006-0013267, filed on Feb. 10, 2006 in the Korean Intellectual Property Office, the disclosure of which is incorporated herein by reference in its entirety.

BACKGROUND OF THE INVENTION

1. Field of the Invention

An embodiment of the present invention relates to a pointing device user interface implementation technology, and more particularly, to a pointing device user interface method, medium, and system robust against external noise that can remove light source noise by distinguishing between light source noise and actual light sources.

2. Description of the Related Art

With the advent of digital TV broadcasting, there has been rapid growth in the field of remote controllers for menu navigation. Accordingly, there has been increased demand for graphic user interfaces (GUIs) for remote controllers. In addition, various types of user interfaces have also been developed and proposed in order to further embody the same with digital content management (DCM). Conventional remote controllers display what is currently being selected by a user and typically permit the selection of a menu or control of particular operations through direction keys, e.g., up, down, left and right direction keys. However, when such direction keys are employed there is limited capability for quickly executing a large variety of operations that may be available, e.g., such as those offered for digital TV. For example, when a digital TV is linked to a network with Internet capabilities, exemplary web browsing cannot be easily controlled with only the direction keys of the remote controller. Accordingly, in order to overcome such remote controller drawbacks, research has been underway for user interface technologies for pointing devices with the capability to determine the position of a cursor on an a display, for example, by directly pointing to a spot on the display.

Such pointing devices control a cursor on the display by extracting/observing a corresponding screen area of the display, e.g., a digital TV, and calculating coordinates of the cursor, or pointed to spot, on the display. Here, it is preferable that the screen area of the display may be directly pointed and an absolute pointed to position be determined by the extracting/observing of the screen area of the display. In order to implement an interface technology using such a pointing device, a pointed to position between a pointing device (e.g., a remote controller, a pointer, and the like) and a display needs to be calculated. However, in the conventional methods, the observing of the screen and determining of the pointed to position has been determined based upon a frequency signal of identifying lights on the display itself, or within a screen area of the display. The frequency signal of the identifying lights may be observed when the pointing device is turned upside down, or the observation may be improperly based on observed noise (lights potentially reflecting off the screen and appearing similar to such identifying lights) and mistakenly identified as such identifying lights. Accordingly, the actual pointed to position may not be properly calculated, resulting in a malfunction of the controlling of the user interface of the display. This potential miscalculation can be more fully seen with the following reference to FIGS. 1A through 2B.

Figure 1A:
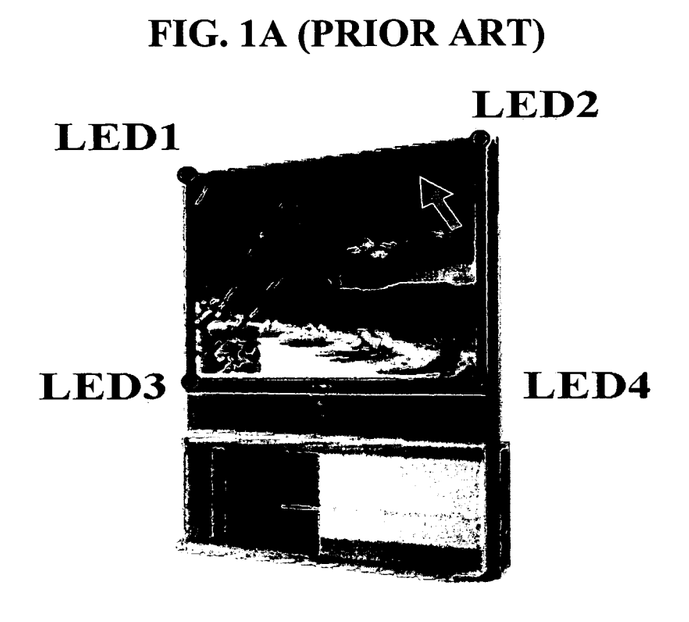
FIGS. 1A and 1B respectively illustrate a display and an incorrectly observed orientation of the display when a pointing device is rotated.
Figure 1B:
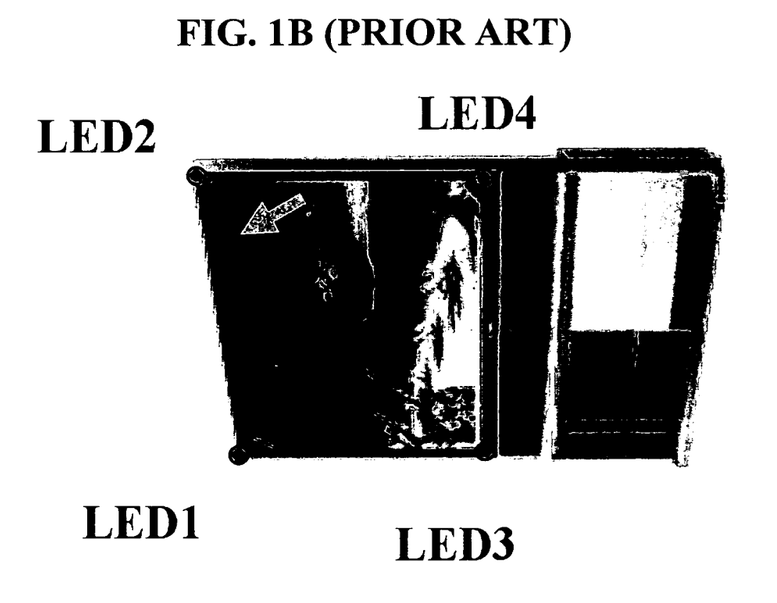

FIG. 1A illustrates the actual arrangement order of light sources disposed on the screen of a display, while FIG. 1B illustrates an image of the display as picked up by a camera disposed with the pointing device. Accordingly, FIG. 1B illustrates an incorrect operation observation problem, in a state, where a pointing device has been rotated, according to a conventional technology. As can be seen by FIG. 1B, on the picked up image, light sources LED1, LED2, LED3, and LED4 are mistakenly recognized as light sources LED3, LED1, LED4, and LED2, respectively, resulting in coordinate values calculated from the pointing device being improperly calculated to correspond to a different point rotated by 90 degrees. That is, if a pointed to spot is moved upward, the actual cursor may move to the right on the screen. Likewise, when the pointing device is upside down or rotated along the alternate 90 degrees, the display would similarly operate improperly.

Figure 2A:
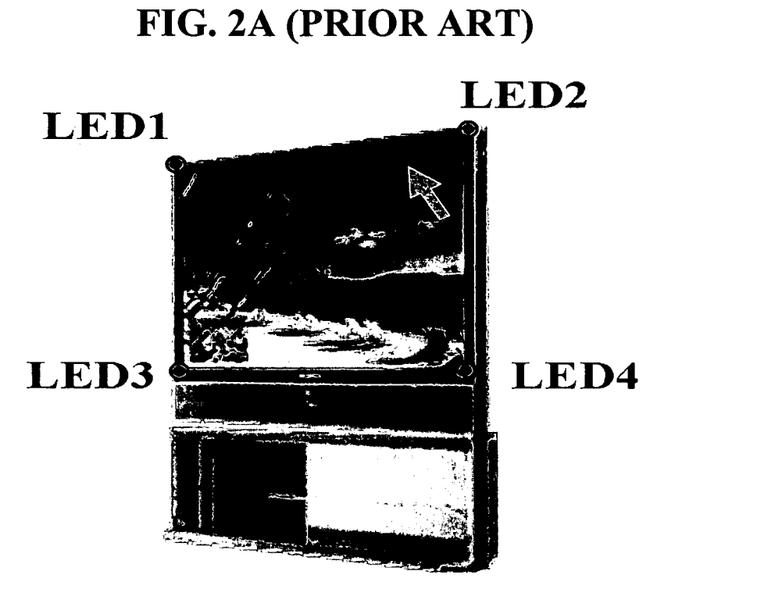
FIGS. 2A and 2B respectively illustrate a display and an incorrectly observed orientation of the display when noise exists in the observed display.
Figure 2B:
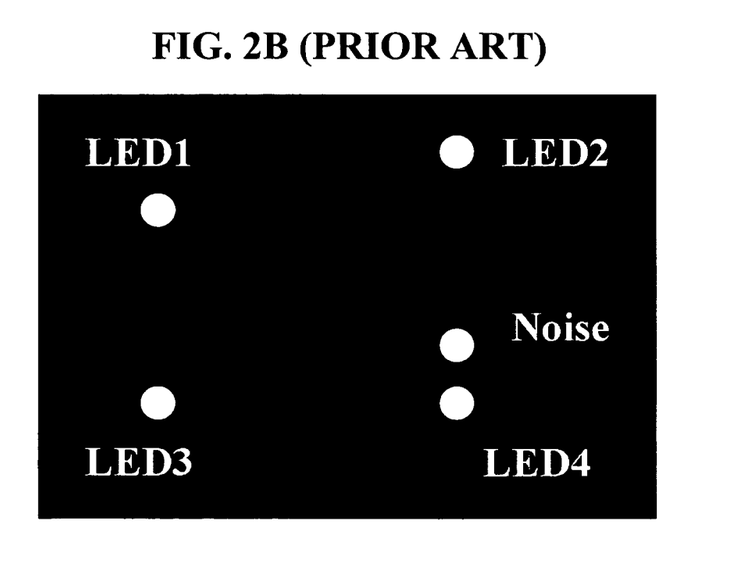

Similarly, FIGS. 2A and 2B illustrate another conventional incorrect operation problem where noise of non-designated light sources exist. Here, FIG. 2A illustrates a display and light sources disposed along outer edges of the display or screen of the display, while FIG. 2B illustrates the actual image picked up by a camera with the pointing device. As can be seen by FIG. 2B, the pointing device may not be able to recognized which observed light is actually noise. Accordingly, the display cannot be operated properly because the coordinates of the position actually pointed by the pointing device is either miscalculated or may not even be determined.

SUMMARY OF THE INVENTION

An embodiment of the present invention provides a pointing method, medium, and system robust against external noise, which can prevent miscalculations when a pointing signal is transmitted while the pointing device is rotated by 90 degrees or turned upside down, both from a norm, and a method of implementing a user interface using the pointing device.

An embodiment of the present invention provides a pointing method, medium, and system robust against external noise, which can prevent miscalculations when a noise light source exists.

Additional aspects and/or advantages of the invention will be set forth in part in the description which follows and, in part, will be apparent from the description, or may be learned by practice of the invention.

To achieve at least the above and/or other aspects and advantage, embodiments of the present invention include a pointing system, including a synchronization signal detection unit to detect a synchronization signal based on respective observed different selective emissions from a plurality of light sources, a light source position information detection unit to detect position information for the light sources by driving a camera in synchronization with the synchronization signal, and a pointed position calculation unit to calculate a position pointed to by a pointing element by using the position information of the light sources.

The synchronization signal may be detected based on the plurality of light sources sequentially blinking at a predetermined period.

In addition, the plurality of light sources may be turned off and on sequentially one by one, from a state where all the plurality of light sources are turned on, and the predetermined period may match with a frame rate of the camera for scanning a screen of a display.

Further, the synchronization signal detection unit may detect the synchronization signal by calculating a time interval between a rising edge and a falling edge of a respective signal corresponding to a detected emission by each of the plurality of light sources.

The system may further include a signal reception unit to receive the observed emissions by the plurality of light sources and providing corresponding signals to the synchronization signal detection unit.

The plurality of light sources may include a plurality of light emitting diodes (LEDs) disposed along peripheral portions of a screen of a display. Further, the camera may include a charge coupled device (CCD) sensor or a complementary metal oxide semiconductor field effect transistor (CMOS) sensor, for example.

The system may further include a noise removal unit to identify noise light sources from among observed light sources based on the position information and use the identifying of the noise light sources in identifying non-noise light sources for removal of the noise light sources from a set of the observed light sources, with the pointed position calculation unit calculating the position pointed to by the pointing element by using the position information of the non-noise light source light sources.

Here the noise removal unit may identify the noise light sources by comparing the position information of the light source at a current time point with corresponding position information at a previous time point to determine whether a corresponding light source has been added and whether a corresponding light sources has disappeared and by indexing the noise light sources and the non-noise light sources.

Further, if the noise removal unit does not index all non-noise light sources, the pointed position calculation unit may calculate the pointed position by temporarily indexing non-noise light sources that are not indexed, by referring to the position information of non-noise light sources that are indexed, and if the noise removal unit indexes all the non-noise light sources, the pointed position calculation unit may calculate the pointed position of a non-noise light source that is turned off, by referring to the position information at a previous time point when the corresponding non-noise light source was turned on.

To achieve at least the above and/or other aspects and advantage, embodiments of the present invention include a pointing reception system, including a light source output unit to emit light to a pointing device by selectively using a respective plurality of light sources differently, a data reception unit to receive position information corresponding to a pointed to position of the pointing device, from the pointing device, and a display control unit to change output data for a display based on the position information corresponding to the pointed to position of the pointing device.

The data reception unit may further receive respective position information corresponding to the emitted light from the plurality of light sources.

Further, the selective use of the plurality of light sources may include selective blinking of the plurality of light sources sequentially at a predetermined period.

The system may further include a blinking control unit to control the selective blinking of the light sources, and a pointed position calculation unit to calculate the pointed to position based on position information of non-noise light sources obtained by removing noise light sources from a set of observed light sources.

Here, the plurality of light sources may be turned off and on, sequentially one by one from a state where all the plurality of light sources are turned on, and the predetermined period may match with a frame rate of a camera, observing the plurality of light sources, with the frame rate being for scanning a screen of a display.

To achieve at least the above and/or other aspects and advantage, embodiments of the present invention include a pointing system, including a synchronization signal detection unit to detect a synchronization signal based on respective observed different selective emissions from a plurality of light sources, a light source position information detection unit to detect position information for the plurality of light sources by driving a camera in synchronization with the synchronization signal, a pointed position calculation unit to calculate a position pointed to by a pointing element by using the position information of the light sources, a light source output unit to control the selective different emissions of light by the plurality of light sources, a display control unit to change output data for a display based on the pointed to position of the pointing element.

To achieve at least the above and/or other aspects and advantage, embodiments of the present invention include a pointing method, including detecting a synchronization signal based on respective observed different selective emissions from a plurality of light sources, detecting position information for the plurality of light sources by driving a camera in synchronization with the synchronization signal, and calculating a position pointed to by a pointing device by using the position information of the plurality of light sources.

The synchronization signal may be detected based on the plurality of light sources sequentially blinking at a predetermined period.

Here, the plurality of light sources may be turned off and on sequentially one by one, from a state where all the plurality of light sources are turned on, and the predetermined period may match with a frame rate of the camera for scanning a screen of a display.

In the detecting of the synchronization signal, the synchronization signal may be detected by calculating a time interval between a rising edge and a falling edge of a respective signal corresponding to a detected emission by each of the plurality of light sources.

The method may further include detecting the synchronization signal by deriving respective signals from the received observed emissions by the plurality of light sources.

Further, the plurality of light sources may include a plurality of light emitting diodes (LEDs) disposed along peripheral portions of a screen of a display, and the camera may include a charge coupled device (CCD) sensor or a complementary metal oxide semiconductor field effect transistor (CMOS) sensor.

The method may further include identifying noise light sources from among observed light sources based on the position information and using the identifying of the noise light sources in identifying non-noise light sources for removal of the noise light sources from a set of the observed light sources, with the calculating of the position pointed to by the pointing device being accomplished by using the position information of the non-noise light source light sources.

In the identifying of the noise light sources, the position information of the light source at a current time point may be compared with corresponding position information at a previous time point to determine whether a corresponding light source has been added and/or whether a corresponding light source has disappeared, and may include indexing the noise light sources and the non-noise light sources.

The calculating of the pointed position may further include calculating the pointed position, by temporarily indexing non-noise light sources that are not indexed, by referring to position information of non-noise light sources that are indexed, if all the non-noise light sources are not indexed in the identifying of the noise light sources, and calculating the pointed position of a non-noise light source that is turned off, by referring to the position information at a previous time point when the non-noise light source was turned on, if all the non-noise light sources are indexed.

To achieve at least the above and/or other aspects and advantage, embodiments of the present invention include a method of implementing a user interface, including emitting light by selectively using respective plurality of light sources differently, receiving position information corresponding to a pointed to position of a pointing device, from the pointing device, and changing output data for a display based on the position information corresponding to the pointed to position of the pointing device.

The receiving of the position information may further include receiving respective position information corresponding to the emitted light from the plurality of light sources.

The selective use of the plurality of light sources may also include selectively blinking the plurality of light sources sequentially at a predetermined period.

The method may still further include controlling the selective blinking of the light sources, and calculating the pointed to position based on position information of non-noise light sources obtained by removing noise light sources from a set of observed light sources.

The plurality of light sources may be turned off and on, sequentially one by one from a state where all the plurality of light sources are turned on, and the predetermined period may match with a frame rate of a camera, observing the plurality of light sources, with the frame rate being for scanning a screen of a display.

To achieve at least the above and/or other aspects and advantage, embodiments of the present invention include at least one medium including computer readable code to control at least one processing element to implement an embodiment of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to embodiments of the present invention, examples of which are illustrated in the accompanying drawings, wherein like reference numerals refer to the like elements throughout. Below, it should be noted that the present invention may be embodied in many different forms/ways and should not be construed as being limited to embodiments set forth herein. Embodiments are described below to explain the present invention by referring to the figures.

Figure 3A:
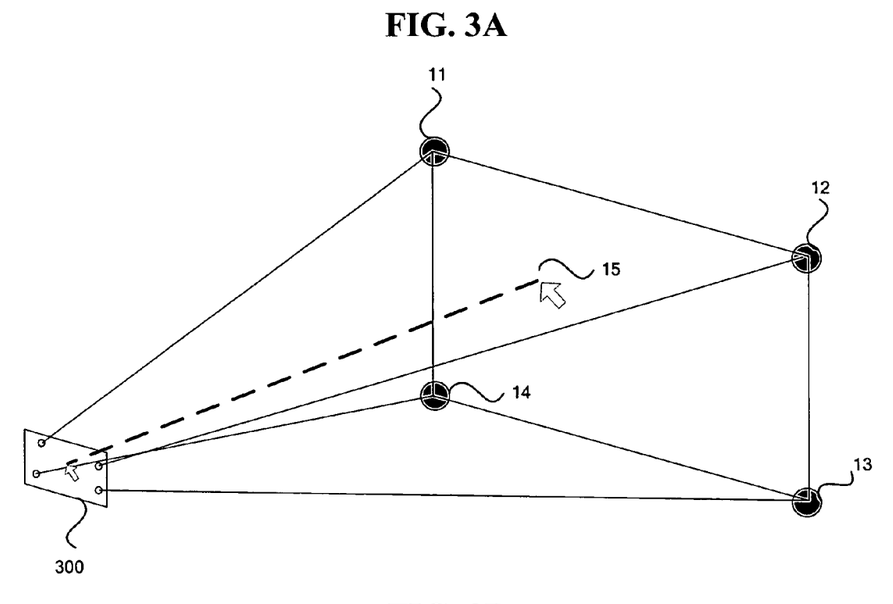
FIGS. 3A and 3B illustrate a pointing device operation, according to an embodiment of the present invention.
Figure 3B:
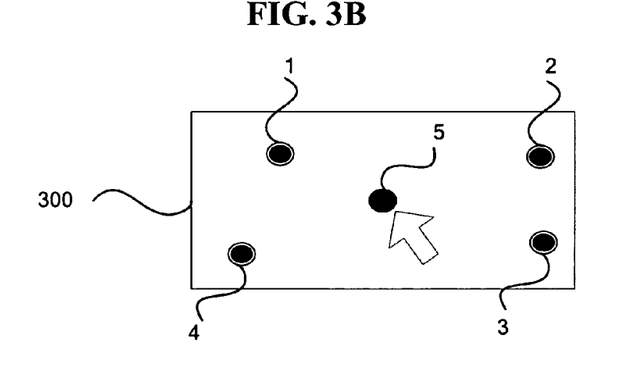

FIGS. 3A and 3B illustrate a pointing device operation, according to an embodiment of the present invention. In FIG. 3A, reference numerals 11 through 14 identify light sources, for example, emitting potential infrared or visible ray signals, such that a sensor 300 can detect signals emitted from the light sources 11 through 14, e.g., mounted on the outline of a display, as the FIG. 3B detected positions 1 through 4 for the respective light sources 11 through 14. Here, FIG. 3B merely illustrates a blown-up illustration of the sensor detected signals. In order to prevent interference between the light sources 11 through 14, and potentially other lights (illumination lights, fluorescent lights, TV lights, other signals and the like), each light source 11 through 14 may transmit a particular signal according to a predetermined transmission scheme. For example, if the light sources 11 through 14 transmit signals according to example schemes A, B, C, and D, respectively, and these transmission schemes are preset/known between the controller of the light sources 11 through 14 and the sensor 300 in advance, the sensor 300 can determine which light source transmits each signal received by the sensor 300. In order to preset signals, the setting for separate light source signals may be stored in the sensor 300, for example, in advance or data to preset the signals may be exchanged between the sensor 300 and the display during operation of the pointing device, noting that alternative embodiments are equally available.

Accordingly, if a spot/position 15 on a display, for example, is pointed to by pointing a device and detected by the sensor 300, the position 15 may become a center 5 of the observed screen area, e.g., of the display, for the sensor 300. Here, the center 5 for the sensor 300 may be calculated by itself, even without such a predetermined signal, for example. As a result, a matrix H may be used to convert the positions 1 through 4, obtained by sensing the light sources 11 through 14, into calculated positions of the light sources 11 through 14, such a matrix H may be applied to the center 5 of the sensor 300 so that the position 15, pointed to by the pointing device, can be calculated.

Figure 4:
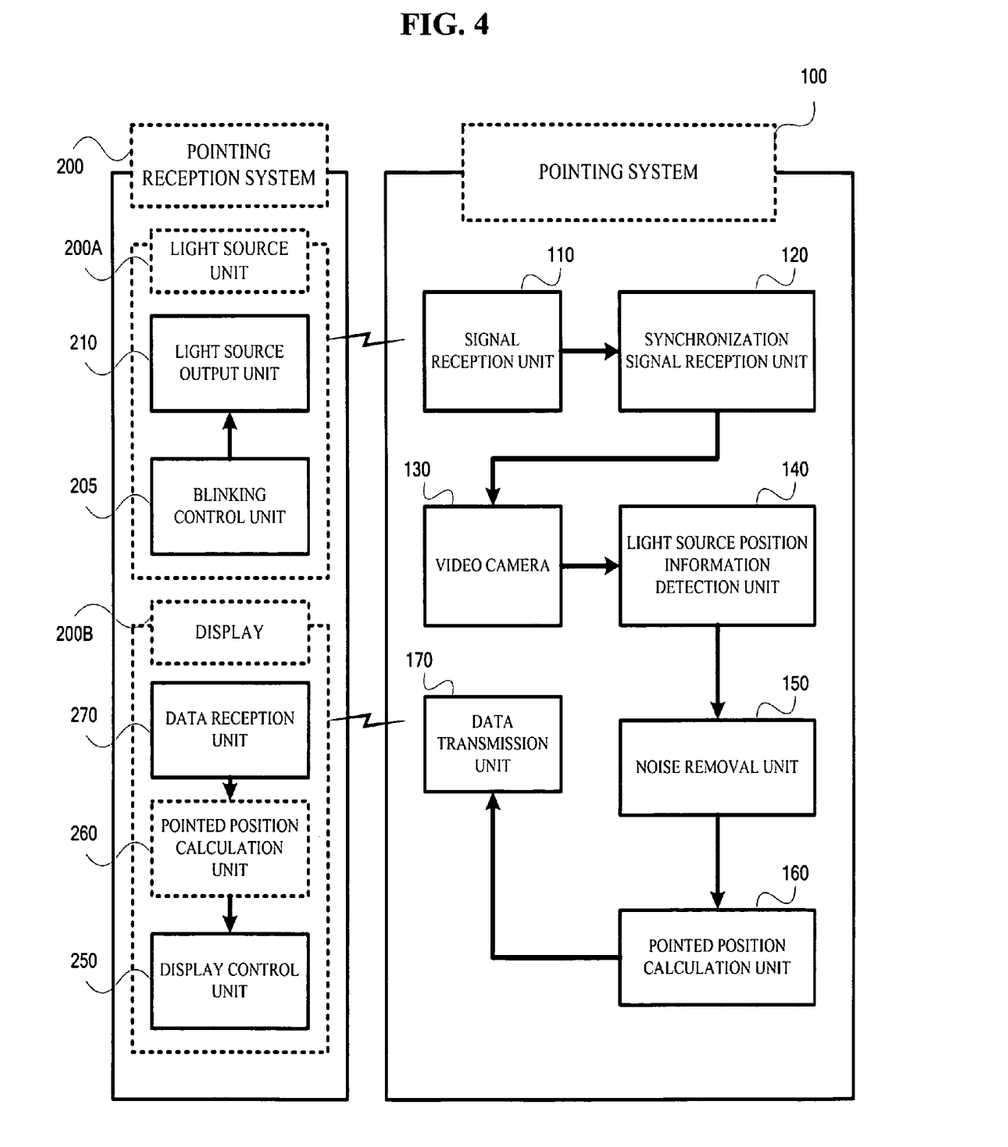
FIG. 4 illustrates a pointing and/or pointing reception system that is robust against noise, according to an embodiment of the present invention.

FIG. 4 illustrates a pointing system 100 and a pointing reception system 200 robust against noise, according to an embodiment of the present invention. Referring to FIG. 4, the pointing system 100 may include a signal reception unit 110, a synchronization signal detection unit 120, a video camera 130, a light source position information detection unit 140, a noise removal unit 150, a pointed position calculation unit 160, and a data communication unit 170, for example.

The signal reception unit 110 may receive a signal emitted by a plurality of light sources and provide the received signals to the synchronization signal detection unit 120, which will be explained in greater detail below. Here, the plurality of light sources may generally be disposed on a peripheral portion of the screen of the display, for example, with there being four light sources, further as only an example. In this regard, embodiments of the present invention are not limited to such arrangements, e.g., the light sources may alternatively be disposed within the screen area of the display and/or there may be more or less than four light sources.

The light sources referenced in the systems of FIG. 4 mainly correspond to non-noise light sources, i.e., expected normal light sources, such as those arranged on the display, but may also include noise light sources, e.g., unexpected external illumination lights, fluorescent lights, TV lights, reflected light from the non-noise light sources, etc. In an embodiment, light emitting diodes (LEDs) may be used for the non-noise light sources.

The synchronization signal detection unit 120 may receive signals emitted by one or more of the plurality of light sources, such as a sequentially blinking of the light sources at predetermined periods, through the signal reception unit 110 and, potentially, detect a synchronization signal of the plurality light sources from the received signals. A detecting of the synchronization signal, according to an embodiment of the present invention, will be explained in greater detail below with reference to FIGS. 5A through 7B.

Figure 5A:
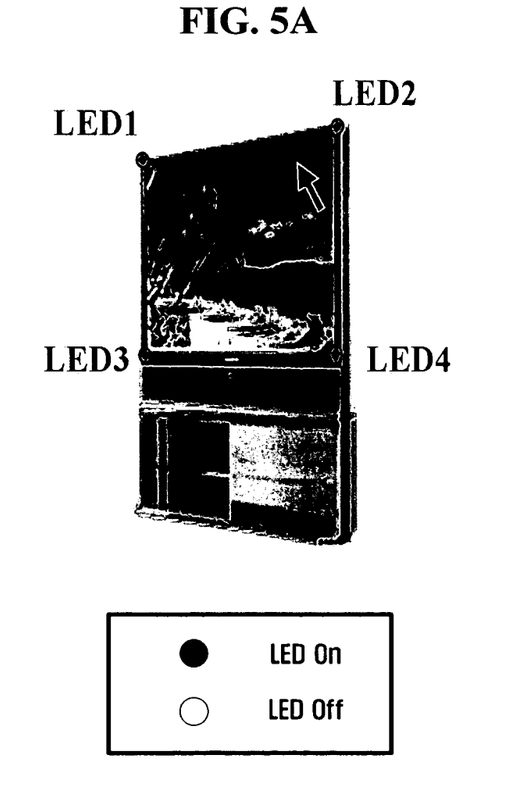
FIGS. 5A and 5B respectively illustrate a display and a corresponding method of matching a period of a light source with a frame rate of a camera, according to an embodiment of the present invention.
Figure 5B:
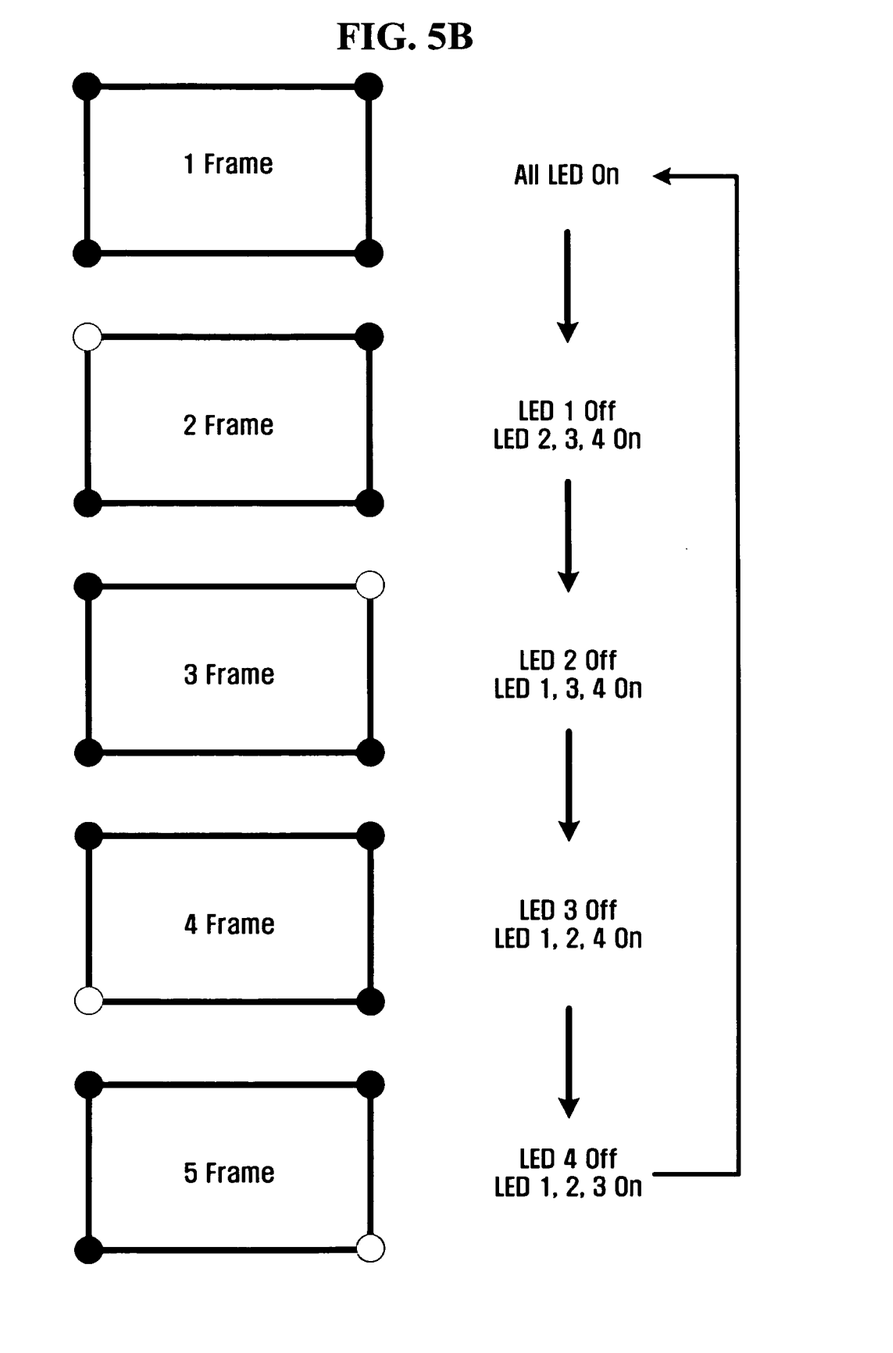

FIG. 5A illustrates a display with four light sources LED1, LED2, LED3, LED4, and FIG. 5B illustrates a method of matching a period of a light source with a frame rate of a pointing device, according to an embodiment of the present invention. FIG. 5B illustrates five sequential frames for the screen of the display. Here, as each frame sequence changes, LEDs may be turned on and off sequentially. According to an embodiment of the present invention, the number of frame sequences may be set to be one more than the number of the LEDs, e.g., if six LEDs are implemented, there may be seven frame sequences for the screen of the display. Alternatively, embodiments of the present invention are not limited to these above numbers of the LEDs and frame sequences, as alternative embodiments are equally available.

Thus, according to one embodiment, and as illustrated in frame sequence 1, all four LEDs are turned on; in frame sequence 2, LED1 is turned off and the remaining LEDs LED2, LED3, and LED4 are turned on; in frame sequence 3, LED2 is turned off and the remaining LEDs LED1, LED3, and LED4 are turned on; in frame sequence 4, LED3 is turned off and the remaining LEDs LED1, LED2, and LED4 are turned on; and in frame sequence 5, LED4 is turned off and the remaining LEDs LED1, LED2, and LED3 are turned on. After frame sequence 5, all LEDs may again all be turned on. Accordingly, it can be seen that the frame sequence states can be repeated again from frame sequence 1. That is, the plurality of LEDs may begin from a state of all being turned on, and according to the predetermined sequence, one LED is turned off and on, one at a time, causing the state of the frame sequence to be changed. Accordingly, it can be said that the blinking period of the LEDs is synchronized with a frame rate, which is a speed at which the video camera 130 scans the screen of the display 200B, i.e., each frame sequence can correspond directly with each respective frame detected by a sensor, with the sensor having a particular frame rate detection capability.

Figure 6:
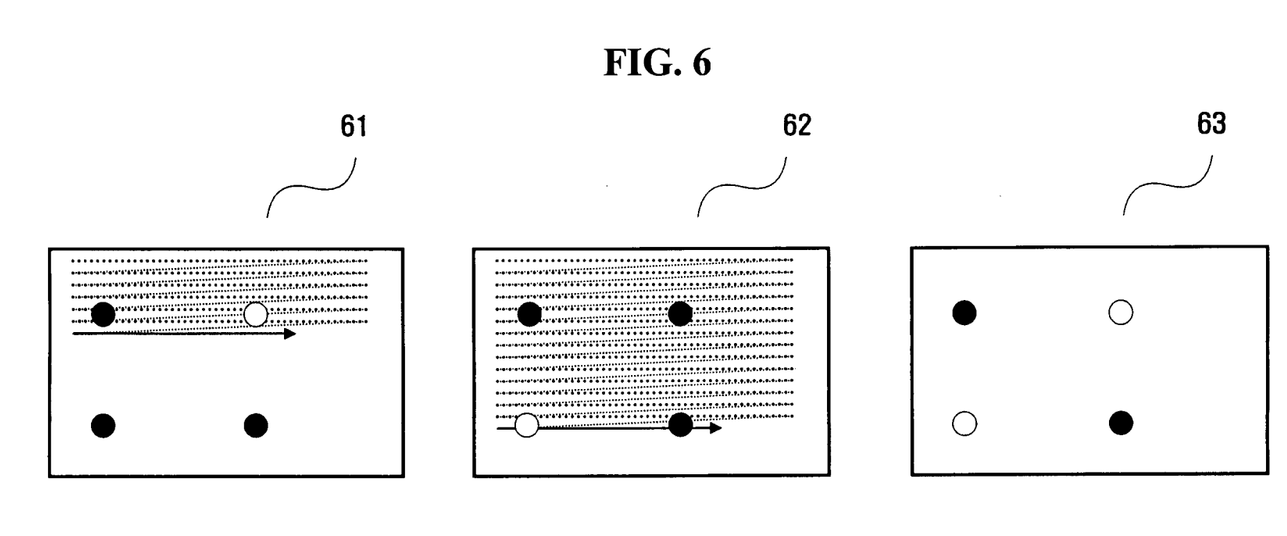
FIG. 6 illustrates problems that may occur in pointing devices, such as a pointing device implementing the method of FIG. 5.

However, even though the blinking period of the LEDs may be synchronized with the frame rate, if the LEDs blink or change their signals, for example, while the video camera 130 scans an image, the positions of the LEDS may still not be detected. This problem is illustrated in FIG. 6., which illustrates an image 61 with a scanning of the video camera 130 beginning in frame sequence 3, i.e., at a state in which LED2 is turned off, such that when the frame sequence changes, as shown in image 62, to frame sequence 4, i.e., at a state where LED2 is turned on and LED3 is newly turned off, the final image 63 may be observed. That is, the final image 63, in which both LEDs 2 and 3 are observed as being off, may be incorrectly output as the observed frame.

Accordingly, to solve this potential problem, an additional synchronization process may be implemented, as will now be explained with reference to FIGS. 7A and 7B. Here, FIGS. 7A and 7B illustrate an implementation of detecting a synchronization signal from signals emitted from a plurality of light sources, according to an embodiment of the present invention.

Figure 7A:
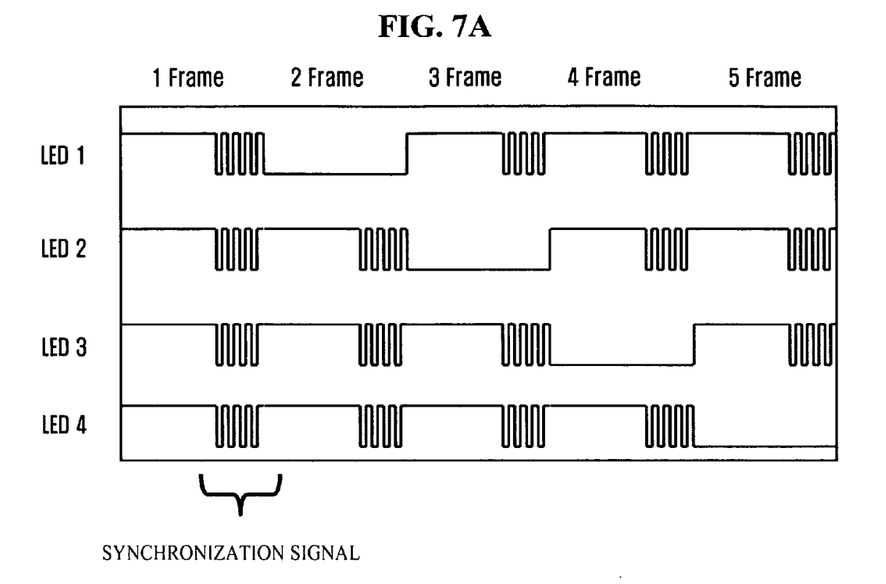
FIGS. 7A and 7B illustrate an implementation of detecting a synchronization signal from signals emitted from a plurality of light sources, according to an embodiment of the present invention.
Figure 7B:
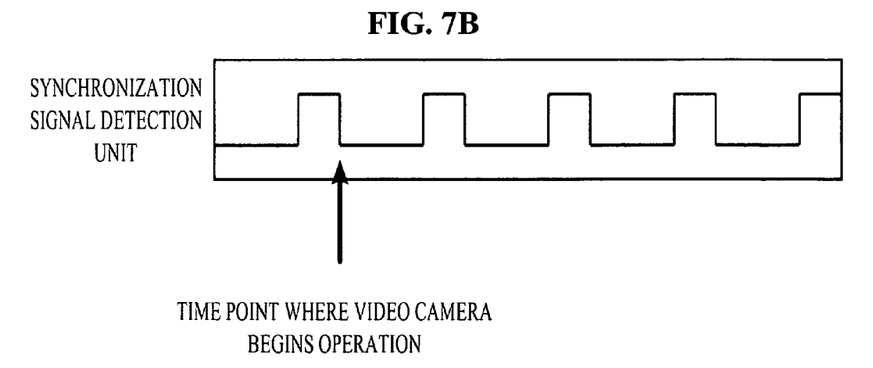

Referring to FIG. 7A, while LED1 through LED4 emit high frequency signals, for example, with each LED being turned off sequentially in a corresponding frame sequence, the synchronization signal detection unit 120 may detect a rising edge and falling edge for each high frequency signal emitted by LED1 through LED4, and by calculating the time interval of the detected rising edge and falling edge, determine whether the high frequency signal correspond to a synchronization signal.

In one embodiment, immediately after it is determined that a high frequency signal is a synchronization signal, the video camera 130 may begin to be driven and the scanning finished before the next rising edge, e.g., immediately before the next rising edge. FIG. 7B illustrates a waveform of such a synchronization signal detected by the synchronization signal detection unit 120, and illustrates that the video camera 130 may be driven the instant a square wave with a predetermined period finishes, according to one embodiment.

Here, the video camera 130 may be one of a charge coupled device (CCD) sensor and a complementary metal oxide semiconductor field effect transistor (CMOS) sensor, for example. In such an arrangement, the CCD sensor may employ a method of sensing a maximum value of a light amount (the quantity of light) in relation to each pixel. Briefly, it is noted that alternate embodiments are equally available.

Meanwhile, according to the above embodiment, the light source position information detection unit 140 may drive the video camera 130 at the time when the falling edge of the synchronization signal, detected by the synchronization signal detection unit 120, and through the video camera 130, detect the position information of the entire light sources, including the LED light sources disposed on the display and other noise light sources, for example.

The noise removal unit 150 may distinguish noise light sources and non-noise light sources among the light sources, by using position information of detected light sources, and remove the noise light sources.

A method of removing such noise will now be further explained. First, the noise removal unit 150 may determine whether a light source has been turned on and newly added or has been turned off and does not appear, by comparing position information of a current time point of the light source with that of the previous time point. By doing so, it can be found which light source is currently turned off, and in turn it can be found which of frame sequences 1 through 5 is the current frame sequence state. If the frame sequence state is identified, the non-noise light sources (LED light sources in the present embodiment) can be distinguished from noise that could be identified as a light source(s), and therefore, such noise light sources may be removed by the noise removal unit 150.

The pointed position calculation unit 160 may calculate the position pointed to by the pointing device 100, by using the position information of the non-noise light sources remaining after the noise light sources have been removed. This will be explained in greater detail in relation to a case where the noise removal unit 150 indexes the non-noise light sources, e.g., all non-noise light sources, and a case where the noise removal unit 150 does not index the non-noise light sources, or all the non-noise light sources.

First, according to one embodiment, in the case where the noise removal unit 150 does not index all the non-noise light sources, the pointed position calculation unit 160 may refer to the position information of the indexed non-noise light sources in relation to the non-noise light sources that are not indexed, so that non-noise light sources existing closest to the indexed non-noise light sources can be temporarily indexed. However, according to an embodiment, where the noise removal unit 150 indexes all the non-noise light sources, if the current frame state is not frame sequence 1 (a frame state where all LED light sources are turned on) the position of one non-noise light source that is turned off should be identified. For this, the position of the non-noise light source that is turned off may be corrected by referring to the position information of the previous time point when the non-noise light source was turned on. Accordingly, the pointed position calculation unit 160 may calculate the position pointed to by the pointing device 100 with the information on the indexed result as described above, and the position information of the non-noise light source for which the position correction is performed.

The data transmission unit 170 may, thus, transmit information on the pointed to position to the data reception unit 270, e.g., of the display 200B, and then the display 200B may display the pointing operation according to the received information or may perform a job corresponding to the pointing operation preset in the display 200B.

The data transmission unit 170 and the data reception unit 270, e.g., of the display 200B, may communicate data in a variety of ways that can be implemented through a variety of communication media, such as conventional infrared communication, RF communication, and wired communication. Accordingly, the communication method is not limited to a predetermined method of transmitting and receiving a light signal between the pointing device 100 and the display 200B.

Also, an input unit (not shown) may be disposed on the pointing device 100, and the input unit can be implemented as a button or touch panel on the pointing device 100, for example. If the button of the input unit (not shown) is pressed with the pointing device pointing at a predetermined position, e.g., on the display, a menu item displayed on the pointed spot may be executed or a predetermined function may be performed. In addition, the input unit (not shown) may be driven by an automated program or hardware, for example.

The pointing reception system 200, e.g., receiving a pointing signal from the pointing device 100, will now be explained in greater detail. Here, a concept of the pointing reception system 200 includes a light source unit 200A, e.g., outputting signals by using the blinking of the light sources, and the display 200B displaying output data with respect to the pointed position information. However, without using such a concept of the pointing reception system 200, the display 200B and the light source unit 200A may be separated and used independently, for example, thereby noting that embodiments are not limited to the above, and alternative embodiments are equally available. In FIG. 4, for convenience of explanation, the light source unit 200A and the display 200B have been explained with the concept of the pointing reception system 200.

Referring again to FIG. 4, the light source unit 200A of the pointing reception system 200 may include a blinking control unit 205 and a light source output unit 210, for example. The display 200B of the pointing reception system 200 may include a display control unit 250, a pointed position calculation unit 260 and the data reception unit 270, also as an example.

The light source output unit 210 may output signals to the signal reception unit 110 of the pointing device 100 by using a plurality of light sources sequentially blinking at predetermined periods, and the blinking control unit 205 may control the blinking of the light sources.

The data reception unit 270 may receive position information corresponding to a light source for a signal received by the pointing device 100 and the position information pointed to by the pointing device 100 from the data transmission unit 170 of the pointing device 100.

As described above, the data transmission unit 170 and the data reception unit 270 may be arranged, according to an embodiment, to communicate data in a variety of ways that can be implemented through a variety of communication media, such as conventional infrared communication, RF communication, and wired communication.

The pointed position calculation unit 260 may calculate a pointed to position by using position information of non-noise light sources, which may be identified light sources identified after noise among observed light sources is removed. The pointed position calculation unit 260 may be included in the pointing device 100 or may be included in the display 200B, for example.

The display control unit 250 may change output data with respect to the pointed position information. According to a currently displayed screen or menu, on a display, the display control unit 250 may control screen information or menu information so that a displayed menu at the pointed to spot is executed or selection of a predetermined menu is implemented. In addition, a pointed to spot can be displayed, for example, and if an arrow indicating the pointed to spot is displayed, a user may easily identify which spot has been identified as being pointed to.

In addition, in the pointing reception system 200, a plurality of light sources may be sequentially turned on and off at predetermined periods from a state in which all light sources are turned on, for example. The period may be set so that the period matches with a scanning frame rate of the video camera 130, i.e., the speed as which the video camera 130 scans a screen of the display 200B.

Figure 8:
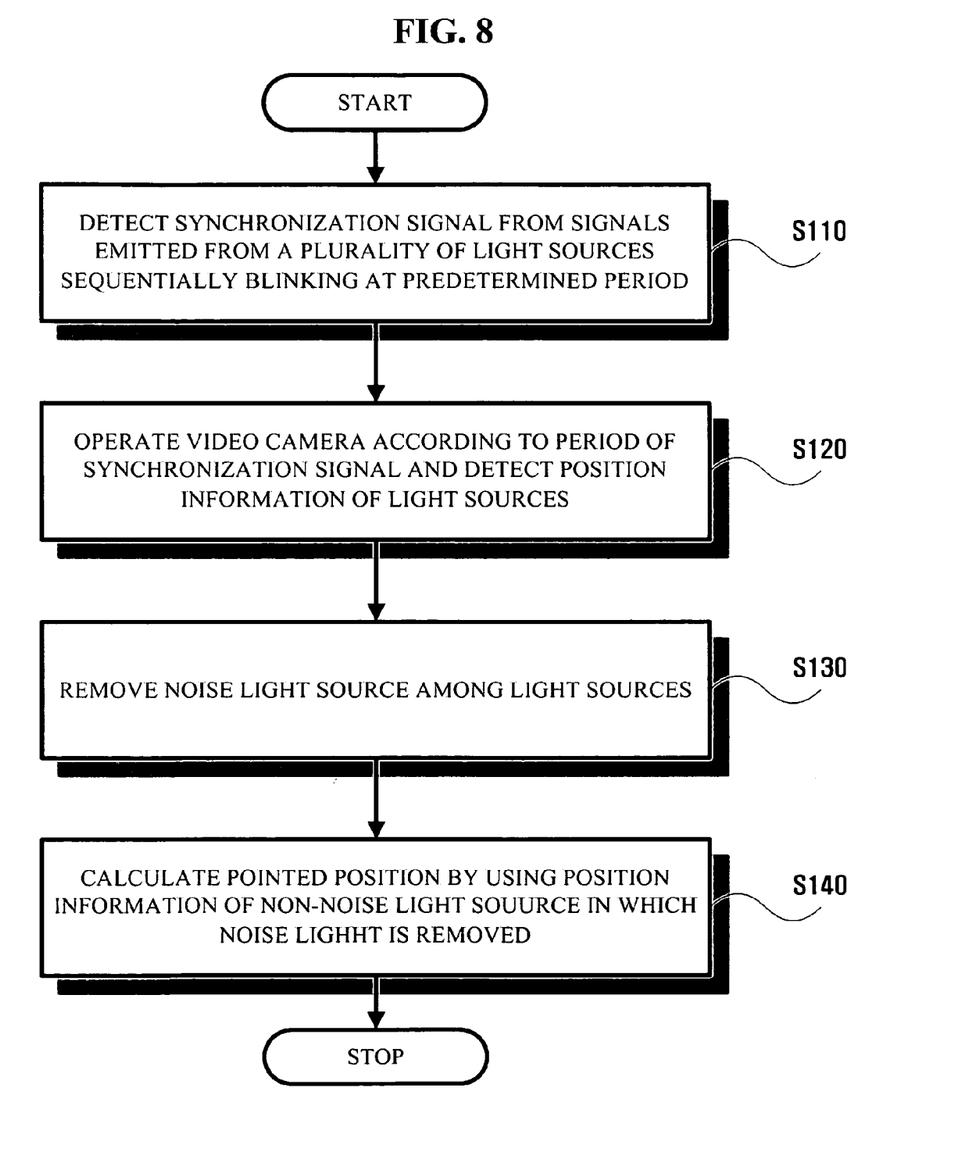
FIG. 8 illustrates a method for implementing a user interface using a pointing device robust against external noise, according to an embodiment of the present invention.
Figure 9:
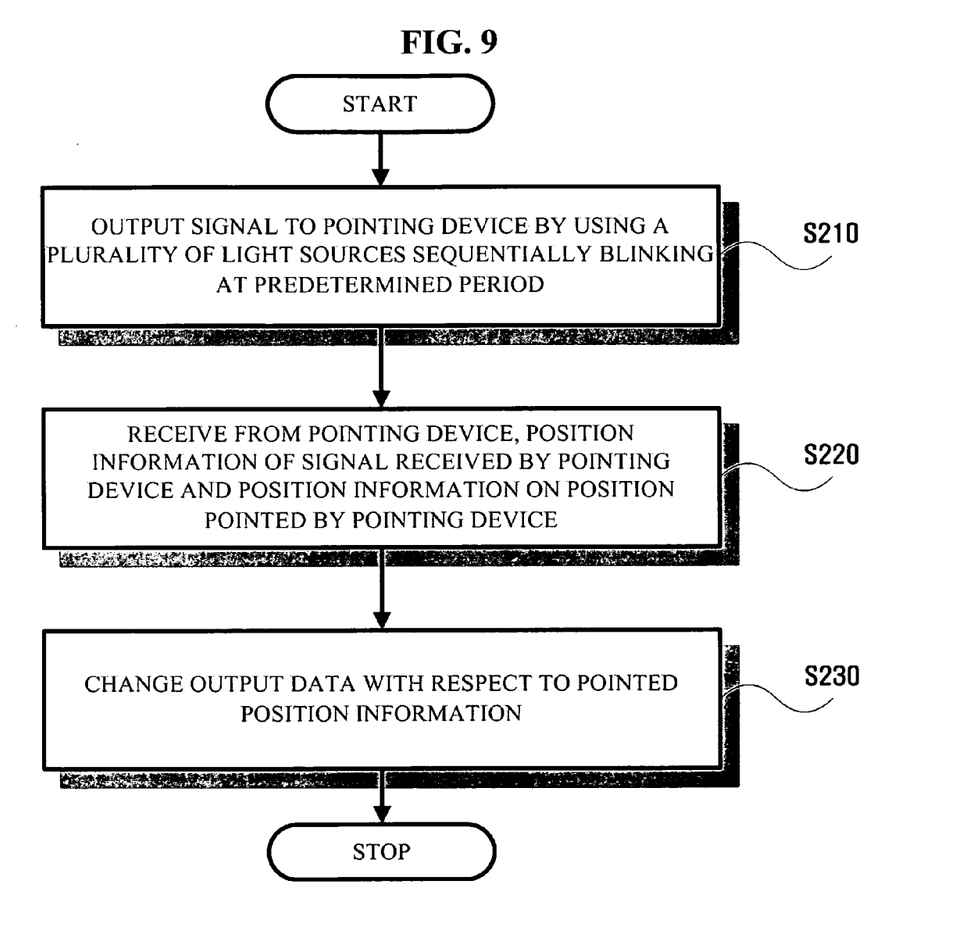
FIG. 9 illustrates a method for implementing a user interface using a pointing device, according to another embodiment of the present invention.

An entire flow of operations in a time series of an embodiment of the present invention will now be more fully explained with reference to FIGS. 8 and 9. FIG. 8 illustrates a method for implementing a user interface using a pointing device robust against external noise, according to an embodiment of the present invention, and FIG. 9 illustrates a method of implementing a user interface using a pointing device, according to another embodiment of the present invention.

Referring first to FIG. 8, a synchronization signal may be detected from signals emitted by a plurality of light sources blinking sequentially at predetermined periods, e.g., by the synchronization signal detection unit 120, in operation S110. Here, in operation S110, the time interval between the rising edge and the falling edge of a signal emitted by each of the plurality of light sources may be calculated to confirm that the signal actually is a synchronization signal, as described above.

The position information of the light source may be detected, e.g., by the light source position information detection unit 140 driving the video camera 130 in synchronization with the period of the synchronization signal, in operation S120. The light sources may further be indexed into noise light sources and non-noise light sources, e.g., by the noise removal unit 150, by using the position information and by doing so, remove noise observed as potential light sources, in operation S130. In particular, by comparing the position information of a light source at a current time point with that of the light source at a previous time point, it may be determined whether the light source has been added or caused to disappear and, by doing so, the noise observed as light sources and the non-noise light sources can be indexed.

Then, a position pointed to by the pointing device 100 may be calculated, e.g., by the pointed position calculation unit 160, by using the position information of the non-noise light sources after the removal of the noise light sources, in operation S140. Here, in the case where not all the non-noise light sources are indexed, in operation S130, the non-noise light sources that are not indexed may be temporarily indexed by referring to the position information of the indexed non-noise light sources. In the case where all the non-noise light sources are indexed, in operation S130, in relation to a non-noise light source that is turned off, the pointed to position of the non-noise light source may be calculated by referring to the position information of the non-noise light source at a previous time when the non-noise light source was turned on.

A method of implementing an interface by using the pointing device 200 according to another embodiment of the present invention will now be explained with reference to FIG. 9.

First, according to a control of the blinking control unit 205, for example, signals may be output from the pointing reception system 200 to the point device 100, e.g., from the light source output unit 210 to the signal reception unit 110 of the pointing device 100, by using a plurality of light sources blinking sequentially at predetermined periods, in operation S210.

Then, according to an embodiment, the data reception unit 270 may receive the position information of the signals received by the pointing device 100 and the position information pointed to by the pointing device 100 from the pointing device 100, in operation S220.

Finally, with respect to the position information pointed to by the pointing device 100, the display control unit 250 may change output data in operation S230, and the output result may be displayed on a display, such as a monitor or a TV.

Herein, a use of the term 'unit', e.g., as used in FIG. 4, means, but is not limited to, a software and/or hardware component, such as a Field Programmable Gate Array (FPGA) or Application Specific Integrated Circuit (ASIC), which performs certain tasks. A unit may also advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operation provided for in the components and units may be combined into fewer components and units or further separated into additional components and units. In addition, the components and units may be implemented such that they execute one or more CPUs in a communication system.

In addition to this discussion, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to an embodiment of the present invention, an incorrect position calculation problem, such as when a pointing device is rotated by 90 degrees or turned upside down, can be prevented.

Furthermore, according to an embodiment of the present invention, an position calculation problem can be prevented when a noise may be incorrectly observed as light source.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pointing system, comprising:
a synchronization signal detection unit to detect a synchronization signal from a selective emission of each light source of a plurality of light sources;
a light source position information detection unit to detect position information of each of the plurality of light sources, using a camera that is driven in synchronization according to the detected synchronization signal, such that a scanning sequence corresponds to the selective emission of one of the light sources relative to the other light sources;
a noise removal unit to determine a position of a noise light source, among the plurality of light sources, and remove the noise light source, using the position information of at least one non-noise light source; and
a pointed position calculation unit to calculate a position pointed to by a pointing element by using the position information of the light sources,
wherein the pointing element comprises the synchronization signal detection unit.

2. The system of claim 1, wherein the synchronization signal is detected based on the plurality of light sources sequentially blinking at a predetermined period.

3. The system of claim 2, wherein the plurality of light sources are turned off and on sequentially one by one, from a state where all the plurality of light sources are turned on, and the predetermined period matches with a frame rate of the camera for scanning a screen of a display.

4. The system of claim 3, wherein the synchronization signal detection unit detects the synchronization signal by calculating a time interval between a rising edge and a falling edge of a respective signal corresponding to a detected emission by each of the plurality of light sources.

5. The system of claim 1, further comprising:
a signal reception unit to receive the observed emissions by the plurality of light sources and providing corresponding signals to the synchronization signal detection unit.

6. The system of claim 1, wherein the plurality of light sources comprise a plurality of light emitting diodes (LEDs) disposed along peripheral portions of a screen of a display.

7. The system of claim 1, wherein the camera comprises a charge coupled device (CCD) sensor or a complementary metal oxide semiconductor field effect transistor (CMOS) sensor.

8. The system of claim 1, further comprising a noise removal unit to identify noise light sources from among observed light sources based on the position information and using the identifying of the noise light sources in identifying the at least one non-noise light sources for removal of the noise light sources from a set of the observed light sources, with the pointed position calculation unit calculating the position pointed to by the pointing element by using the position information of the at least one non-noise light source light sources.

9. The system of claim 8, wherein the noise removal unit identifies the noise light sources by comparing the position information of the light source at a current time point with corresponding position information at a previous time point to determine whether a corresponding light source has been added and whether a corresponding light sources has disappeared and by indexing the noise light sources and the non-noise light sources.

10. The system of claim 9, wherein if the noise removal unit does not index all non-noise light sources, the pointed position calculation unit calculates the pointed position by temporarily indexing non-noise light sources that are not indexed, by referring to the position information of non-noise light sources that are indexed, and if the noise removal unit indexes all the non-noise light sources, the pointed position calculation unit calculates the pointed position of a non-noise light source that is turned off, by referring to the position information at a previous time point when the corresponding non-noise light source was turned on.

11. The pointing system of claim 1, wherein each light source of the plurality of light sources transmits a different signal according to a predetermined transmission process.

12. The pointing system of claim 1, wherein the synchronization signal detection unit detects the synchronization signal based on observed respective selective different emissions from the plurality of light sources.

13. A pointing reception system, comprising:
a light source output unit to emit light to a pointing device, such that a respective light source of a plurality of light sources is selectively emitted differently relative to the remaining light sources, the emitted light including a synchronization signal corresponding to the selective emission of each light source of the plurality of light sources;
a data reception unit to receive position information corresponding to a pointed to position of the pointing device, from the pointing device, the position information being used to determine a position of a noise light source among the plurality of light sources and to remove the noise light source using position information of at least one non-noise light source; and
a display control unit to change output data for a display based on the position information corresponding to the pointed to position of the pointing device.

14. The system of claim 13, wherein the data reception unit further receives respective position information corresponding to the emitted light from the plurality of light sources.

15. The system of claim 13, wherein the selective use of the plurality of light sources includes selective blinking of the plurality of light sources sequentially at a predetermined period.

16. The pointing reception system of claim 15, further comprising:
a blinking control unit to control the selective blinking of the light sources; and
a pointed position calculation unit to calculate the pointed to position based on position information of at least one non-noise light sources obtained by removing noise light sources from a set of observed light sources.

17. The pointing reception system of claim 15, wherein the plurality of light sources are turned off and on, sequentially one by one from a state where all the plurality of light sources are turned on, and the predetermined period matches with a frame rate of a camera, observing the plurality of light sources, with the frame rate being for scanning a screen of a display.

18. The point reception system of claim 13, wherein each light source of the plurality of light sources transmits a different signal according to a predetermined transmission process.

19. A pointing and pointing reception system, comprising:
a synchronization signal detection unit to detect a synchronization signal from a selective emission of each light source of a plurality of light sources;
a light source position information detection unit to detect position information for the plurality of light sources, using a camera that is driven in synchronization according to the detected synchronization signal, such that a scanning sequence corresponds to the selective emission of one of the light sources relative to the other light sources;
a noise removal unit to determine a position of a noise light source, among the plurality of light sources, and remove the noise light source, using position information of at least one non-noise light source;
a pointed position calculation unit to calculate a position pointed to by a pointing element by using the position information of the light sources;
a light source output unit to control the selective different emissions of light by the plurality of light sources; and
a display control unit to change output data for a display based on the pointed to position of the pointing element,
wherein the pointing element comprises the synchronization signal detection unit.

20. The pointing and point reception system of claim 19, wherein each light source of the plurality of light sources transmits a different signal according to a predetermined transmission process.

21. The pointing and point reception system of claim 19, wherein the synchronization signal detection unit detects the synchronization signal based on observed respective selective different emissions from the plurality of light sources.

22. A pointing method, comprising:
detecting a synchronization signal based on an observed different emission of a respective light source of a plurality of light sources relative to the remaining light sources;

detecting position information for the plurality of light sources, using a camera that is driven in synchronization according to the detected synchronization signal;

determining a position of a noise light source, among the plurality of light sources, and removing the noise light source, using the position information of at least one non-noise light source of the plurality of light sources; and calculating a position pointed to by a pointing device by using the position information of the plurality of light sources.

23. The method of claim 22, wherein the synchronization signal is detected based on the plurality of light sources sequentially blinking at a predetermined period.

24. The method of claim 23, wherein the plurality of light sources are turned off and on sequentially one by one, from a state where all the plurality of light sources are turned on, and the predetermined period matches with a frame rate of the camera for scanning a screen of a display.

25. The method of claim 24, wherein, in the detecting of the synchronization signal, the synchronization signal is detected by calculating a time interval between a rising edge and a falling edge of a respective signal corresponding to a detected emission by each of the plurality of light sources.

26. The method of claim 22, further comprising detecting the synchronization signal by deriving respective signals from the received observed emissions by the plurality of light sources.

27. The method of claim 22, wherein the plurality of light sources comprise a plurality of light emitting diodes (LEDs) disposed along peripheral portions of a screen of a display.

28. The method of claim 22, wherein the camera comprises a charge coupled device (CCD) sensor or a complementary metal oxide semiconductor field effect transistor (CMOS) sensor.

29. The method of claim 22, further comprising identifying noise light sources from among observed light sources based on the position information and using the identifying of the noise light sources in identifying the at least one non-noise light sources for removal of the noise light sources from a set of the observed light sources, with the calculating of the position pointed to by the pointing device being accomplished by using the position information of the at least one non-noise light source light sources.

30. The method of claim 22, wherein in the identifying of the noise light sources, the position information of the light source at a current time point is compared with corresponding position information at a previous time point to determine whether a corresponding light source has been added and/or whether a corresponding light source has disappeared, and by indexing the noise light sources and the non-noise light sources.

31. The method of claim 30, wherein the calculating of the pointed position comprises:

calculating the pointed position, by temporarily indexing non-noise light sources that are not indexed, by referring to position information of non-noise light sources that are indexed, if all the non-noise light sources are not indexed in the identifying of the noise light sources; and calculating the pointed position of a non-noise light source that is turned off, by referring to the position information at a previous time point when the non-noise light source was turned on, if all the non-noise light sources are indexed.

32. At least one non-transitory computer readable recording medium comprising computer readable code to control at least one processing element to implement the method of claim 22.

33. The point method of claim 22, wherein each light source of the plurality of light sources transmits a different signal according to a predetermined transmission process.

34. A method of implementing a user interface, comprising:

emitting light by selectively emitting a respective light source of a plurality of light sources differently relative to the remaining light sources, the emitted light including a synchronization signal corresponding to the selective emission of each light source of the plurality of light sources;

receiving position information corresponding to a pointed to position of a pointing device, from the pointing device, the position information being used to determine a position of a noise light source among the plurality of light sources and to remove the noise light source using position information of at least one non-noise light source; and changing output data for a display based on the position information corresponding to the pointed to position of the pointing device.

35. The method of claim 34, wherein receiving of the position information further comprises receiving respective position information corresponding to the emitted light from the plurality of light sources.

36. The method of claim 34, wherein the selective use of the plurality of light sources includes selectively blinking the plurality of light sources sequentially at a predetermined period.

37. The method of claim 36, further comprising:
controlling the selective blinking of the light sources; and
calculating the pointed to position based on position information of at least one non-noise light sources obtained by removing noise light sources from a set of observed light sources.

38. The method of claim 36, wherein the plurality of light sources are turned off and on, sequentially one by one from a state where all the plurality of light sources are turned on, and the predetermined period matches with a frame rate of a camera, observing the plurality of light sources, with the frame rate being for scanning a screen of a display.

39. At least one non-transitory computer readable recording medium comprising computer readable code to control at least one processing element to implement the method of claim 34.

40. The method of claim 34, wherein each light source of the plurality of light sources transmits a different signal according to a predetermined transmission process.

* * * * *